G. H. SCANLAN.
HITCH FOR TRACTORS.
APPLICATION FILED MAR. 2, 1920.
1,366,216.
Patented Jan. 18, 1921.
3 SHEETS—SHEET 1.
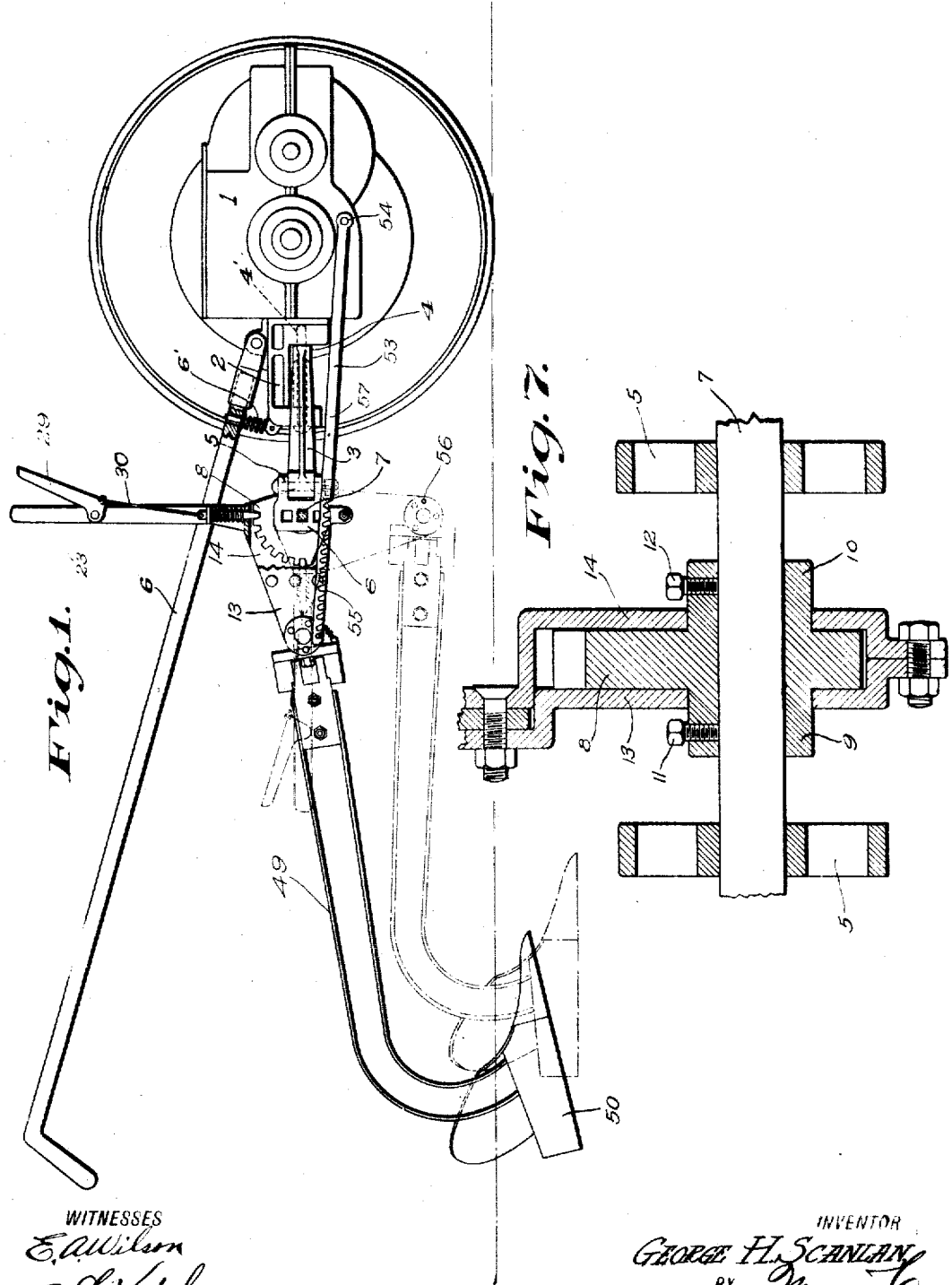
WITNESSES
E. A. Wilson
A. L. Kitchen
INVENTOR
George H. Scanlan
BY Munn & Co
ATTORNEYS

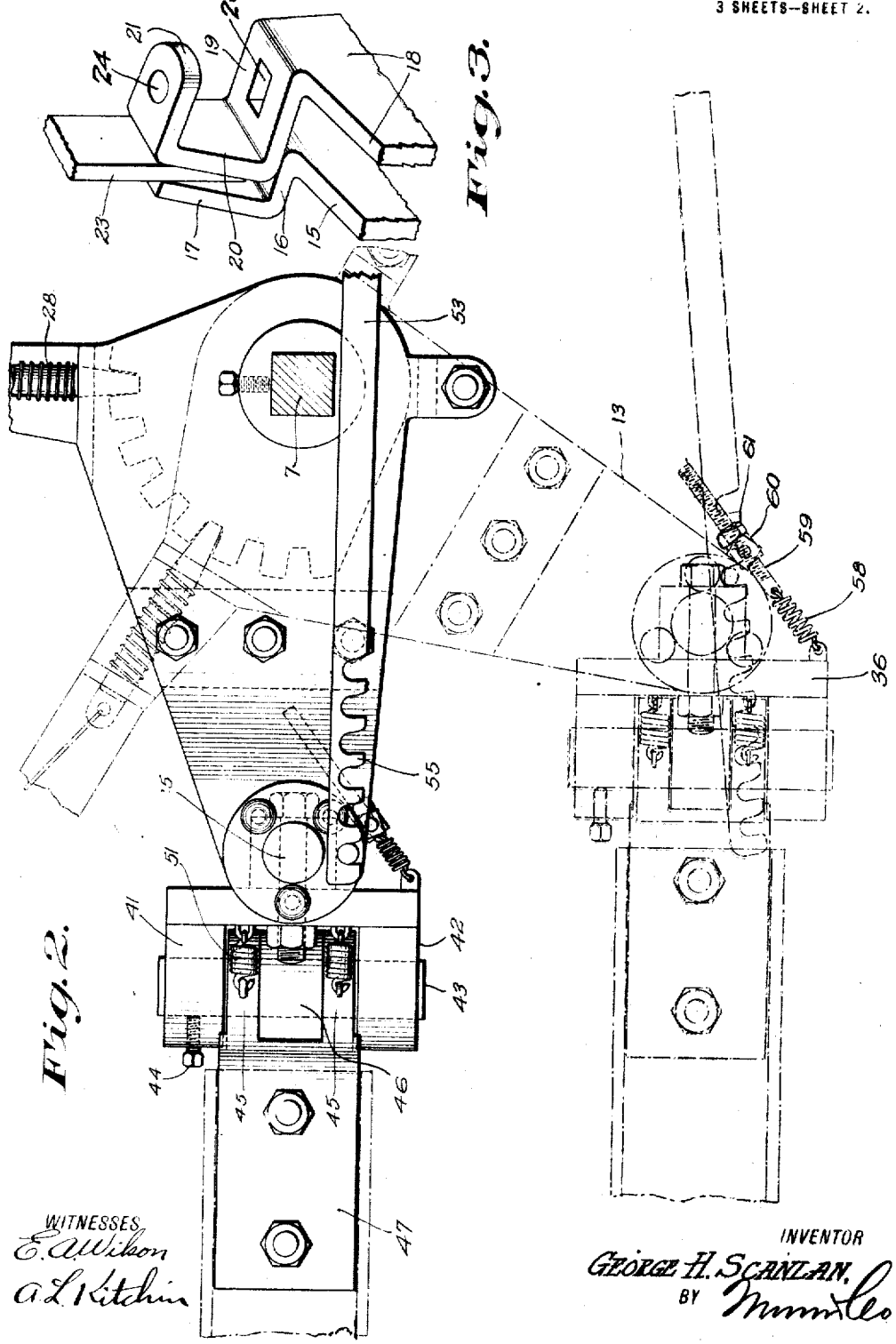

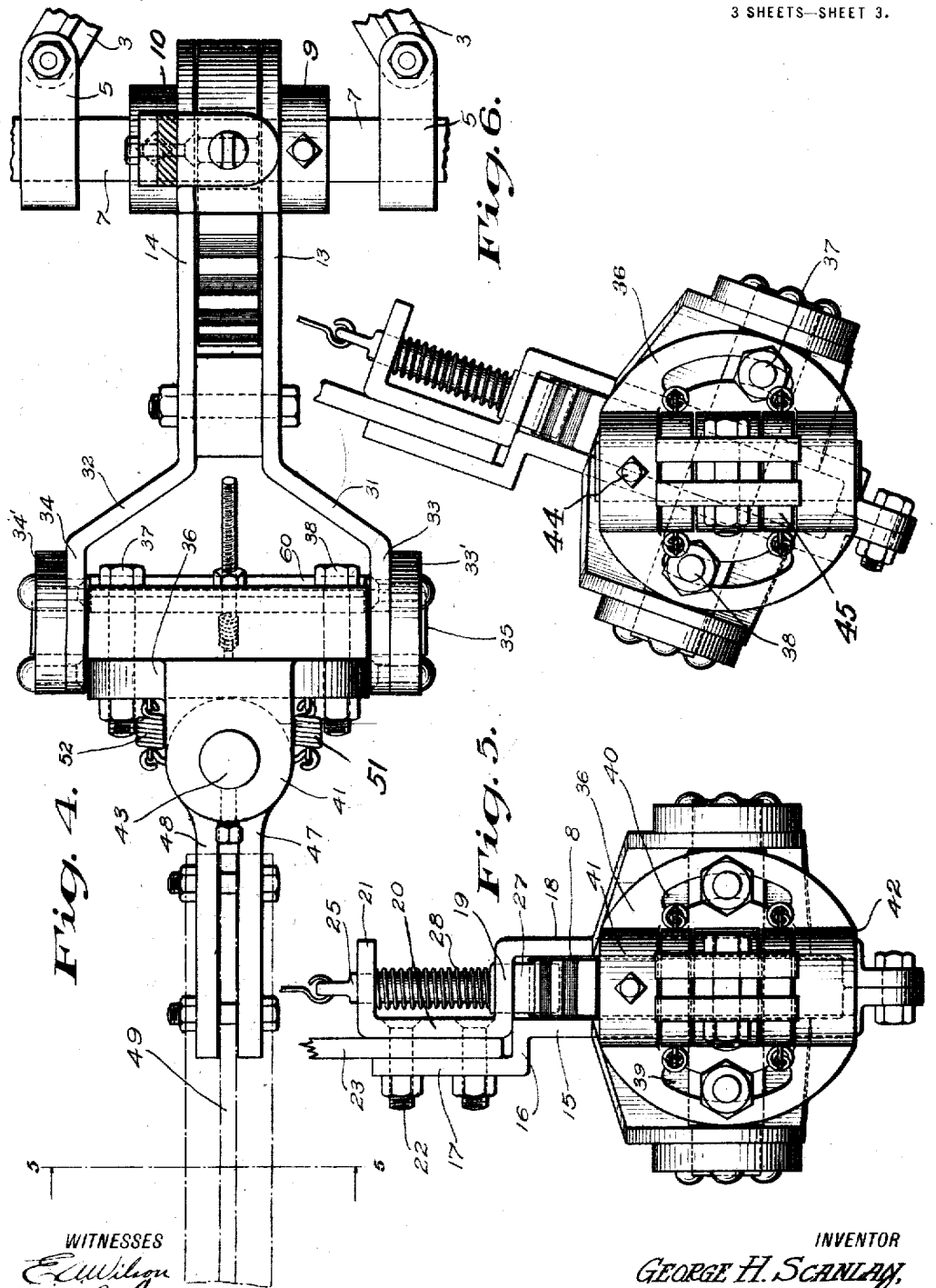

UNITED STATES PATENT OFFICE.

GEORGE H. SCANLAN, OF NEW YORK, N. Y.

HITCH FOR TRACTORS.

1,366,216.  Specification of Letters Patent.  Patented Jan. 18, 1921.

Application filed March 2, 1920. Serial No. 362,736.

*To all whom it may concern:*

Be it known that I, GEORGE H. SCANLAN, a citizen of the United States, and a resident of the city of New York, borough of Manhattan, in the county and State of New York, have invented a new and useful Hitch for Tractors, of which the following is a full, clear, and exact description.

This invention relates to a hitch for tractors, and has for an object to provide an improved construction which may be connected to a tractor of substantially any kind and which will properly hold one or more implements in position to be moved by the tractor.

Another object of the invention is to provide a hitch for tractors which is especially desirable for connecting plows to the tractor, the construction being such that a ready adjustment may be secured for causing the plow to assume various depths while a proper strain is brought to bear thereon continuously.

A further object of the invention is to provide a hitch in which there is an adjustable swinging member and bracing members co-acting therewith whereby the implement connected with the hitch may have its line of draft shifted to different horizontal levels without varying the connection with the tractor.

An additional object is to provide a hitch, which includes in its construction, means for limiting the side movement of an implement connected to the hitch and also limiting the upward movement.

In the accompanying drawings:

Figure 1 is a side view of a hitch embodying the invention, a plow and part of a tractor being shown connected thereto for illustrating not only the construction, but the way the hitch is used.

Fig. 2 is an enlarged side view of the hitch shown in Fig. 1 with dotted positions of certain parts for illustrating the adjustability of the hitch, certain parts being removed.

Fig. 3 is a fragmentary perspective view showing the detail arrangement of spring catch embodying certain features of the invention.

Fig. 4 is a top plan view of the construction shown in Fig. 2.

Fig. 5 is a rear view of the hitch shown in Fig. 4, the same looking from line 5—5.

Fig. 6 is a view similar to Fig. 5, but showing the front part of the hitch tilted to a considerable angle, while the rear part is still in a horizontal position.

Fig. 7 is a fragmentary sectional view through Fig. 4 on line 7—7.

Referring to the accompanying drawings by numerals 1 indicates a tractor of any desired kind, as for instance a tractor of the type shown in my Patent No. 1,324,694, issued December 9, 1919. In connecting the hitch with the tractor 1 any suitable connecting means may be provided which will allow the tractor to move or oscillate freely transversely of its direction of travel, and will permit the plow and associate parts also to rock freely laterally. This connection may be in the form of an attachment 2, bolted or otherwise rigidly secured to the casing of the tractor, and a yoke 3 provided with fittings 5. These fittings have one or more square openings for receiving the square shaft 7, though if desired a round shaft could be used and a key or other means provided for preventing rotation. It will be observed that the fittings 5 are in the nature of clevises and are pivoted on the yoke 3 so as to swing in a horizontal plane, while said yoke is provided with a sleeve 4 adapted to swing in a vertical plane on a pin 4' carried by the attachment 2. If desired a pair of handles 6 could be pivotally mounted on the attachment 2 and resiliently supported by a suitable spring 6' in order to provide steering means at a convenient point.

It will be noted that the handles 6 are not carried by the hitch, nor are they connected to the implements pulled by the hitch, but are connected to the attachment 2 carrying the yoke 3.

Rigidly mounted on the square shaft 7 is a rack 8 having hubs 9 and 10 which are clamped to the shaft 7 by suitable set screws 11 and 12. The exterior surfaces of the hubs 9 and 10 are round so that the draft plates 13 and 14 may freely rotate thereon. These draft plates are constructed as shown more in detail in Figs. 4 and 5, the same being in general shape duplicates, but with certain slight modifications. The plate 14 is provided with an upstanding portion 15 bent at 16 (Fig. 5) for producing the upright section 17. The plate 13 at the rear is provided with a bent up section 18 merging into horizontal section 19, which in turn merges into a vertical section 20 parallel and adjacent the section 17, said section 20 being bent over for presenting a guide and an abutment 21. Bolts or rivets 22 extend through the sections 17 and 20 and also through the lever 23 for holding the same in proper place, and for rigidly securing the same to the plates 13 and 14. The stop 21 is preferably provided with a round opening 24 for receiving the upper part of the latch pin 25, which is pointed at the upper end, while the horizontal section 19 is provided with an elongated opening 26 for receiving the head 27 of latch pin 25, which is shaped to easily slide therethrough. The opening 24 has a diameter equal to the narrowest point of the opening 26 so that the latch pin 25 may freely pass upwardly through the opening or slot 26 and the upper part through the opening 24. A spring surrounds the latch pin 25 and rests at one end against the head 27 and at the opposite end against the stop 21 whereby the head 27 is urged downwardly and into engagement with the teeth of the rack 8. This construction and arrangement provides for locking the side plates 13 and 14 in any desired position notwithstanding the fact they are loosely mounted on the hubs 9 and 10 of the rack 8. The lever 23 at the upper end is provided with a suitable grip extension 29 (Fig. 1), which is pivotally mounted on the lever 23 and which has a rod or wire 30 pivotally connected therewith and also with the upper end of the pin 25 so that whenever desired the operator may move member 29 against the lever 23 and thereby disengage the catch 25 from the rack 8 so as to swing the plates 13 and 14 upwardly or downwardly as desired. The rear part of the plates 13 and 14 are bent at 31 and 32 respectively (Fig 4) and then formed into end sections 33 and 34, which have riveted or otherwise rigidly secured thereto auxiliary sections 33' and 34', which produce an extra thickness so that the rounded ends of the pin 35 may have ample journals. It will be noted that the members 33 and 34 and their auxiliary sections are provided with apertures for accommodating the pin 35 which pin is preferably square in cross section, except at the ends, and fits flatwise against the adjustable disk-like plate 36. Bolts 37 and 38 pass through suitable apertures in pin 35 as shown in Fig. 4, and also through slots 39 and 40 in the disk 36 so as to clamp these two members together. The disk 36 is provided with top and bottom ears 41 and 42 through which a vertical pin 43 extends, said pin being held in position in any desired manner as for instance by a set screw 44, though if desired it could be provided with a head, or a head and nut. The pin 43 not only extends through the ears 41 and 42, but also through the ears or barrels 45 and 46 of the draft plates 47 and 48. These draft plates are bolted or otherwise rigidly secured to the beam 49 of the plow 50, or other implement being moved. The hinge construction provided by the ears or barrels 45 and 46 and the pin 43 permits a free horizontal swinging movement on the pin 43. In order to limit this free movement springs 51 are connected with the ear 45 of the plate 47 while similar springs 52 are connected with plate 48. These springs are also connected with the disk 36 whereby any appreciable side movement in a horizontal plane will be resisted and the parts will be brought back automatically to a neutral central position. In case the ground is substantially level the parts will be adjusted as shown in Fig. 5, but in case one wheel of the tractor is in a furrow the bolts 37 and 38 are loosened and the parts adjusted to the position shown in Fig. 6, after which the nuts are tightened until there is a rigid connection between the disk 36 and the pin 35. This will allow the tractor to travel with one wheel lower than the other and if desired at an angle, while permitting the plow 50 to travel in a horizontal position. In fact an adjustment of this kind is essential when a plow similar to plow 50 is used, as any appreciable tilting thereof would cause the plow to move out of the ground automatically.

When the parts are all connected up as shown in Figs. 1, 2 and 4 for instance, and it is desired to cause the plow 50 to plow as deep a furrow as possible lever 23 is moved over to its extreme lower position as shown in dotted lines in Fig. 1. This will cause the plates 13 and 14, pin 35 and associate parts to move downwardly to the dotted position shown in Fig. 1, so that when the tractor is started the plow will automatically move downwardly to the proper level and thus produce the furrow desired, as the line of strain is at a lower point than when the parts are in the position shown in full lines in Fig. 1. This action produces a twisting strain on the shaft or bar 7, but as the power used is comparatively light said bar will ordinarily take care of this strain. In case a large plow is used, or if for any desired reason it should be thought necessary to assist bar 7 in taking up the strain the link 53 would be used, said link being pivotally connected at 54 to the engine casing and provided with a number of notches 55 at its free end. A suitable pin 56 is connected with plate 33' positioned to interlock with one of the notches 55 when the link 53 is used so that part of the strain will be communicated to the casing of the engine at pivotal point 54. The operator may at substantially any time raise the link 53 and hold the same in an elevated position so as to either transfer all of the strain to shaft 7 or move the parts out of the way when adjusting to an intermediate position, as shown in dotted lines in Fig. 2, whereupon the lever may be dropped back into position and act in the desired manner.

When plowing it sometimes occurs that small stones and some forms of earth will produce such a resistance to the plow 50 as to give the same a tendency to move out of the ground. To provide an effective and proper resistance to this tendency a spring 58 is connected with the lower edge of the disk 36 and to a threaded member 59 extending loosely through a stop 60, which stop is journaled on the plates 13 and 14. A nut 61 is mounted on the threaded member 59 so as to produce whatever tension may be desired on spring 58 for preventing any undesirable swinging movement in a vertical plane of the beam 49 of the plow. When the parts are adjusted to their lowermost position, as shown in Fig. 1, the threaded member 59 will be shifted to the desired position by an operation of the nut 61, while a different position will be provided for the parts when in the position shown in Fig. 2, though the tension of spring 58 is usually the same.

What I claim is:

1. A hitch for tractors comprising a transverse shaft, means for connecting the transverse shaft with a tractor in such a manner that the shaft will not rotate, a rack rigidly connected with said shaft, a member mounted to rotate about said shaft, a catch arranged on said member and positioned to co-act with said rack for locking the rotatable member in any desired position, and means arranged at the free end of the rotatable member for connecting an implement to the rotatable member.

2. A tractor hitch of the character described comprising a bar, means connecting said bar to a tractor so that the bar will extend in a direction at right angle to the line of movement of the tractor, a member connected with said bar formed so as to rotate around said bar, means for shifting said member around said bar in a vertical plane, and means for connecting an implement to the free end of said rotatable member.

3. A hitch of the character described comprising a rack, means connecting said rack with a tractor in such a manner as not to be rotatable, a pivotally mounted member arranged adjacent said rack, means mounted on the pivotally mounted member and co-acting with the rack for swinging the pivotally mounted member in a vertical plane to different positions and locking the same in any desired position in respect to the rack, and pivotally mounted means on the free end of said pivotally mounted member for connecting an implement to said pivotally mounted member, said pivotally mounted means being formed to swivel in such a manner as to permit said implement to rock.

4. A hitch for tractors comprising a bar, means for connecting said bar with a tractor, an arc-shaped rack rigidly secured to said bar, a vertically swinging draft member carried by said bar and movable in a plane parallel with direction of movement of said tractor, a catch carried by said swinging draft member co-acting with said rack for locking the draft member in different positions in respect to the rack and bar, and a pivotally mounted connecting structure carried by the free end of said draft member, said connecting structure being adapted to be connected with an implement.

5. A hitch for tractors comprising a bar, means for connecting said bar with a tractor in such a manner as to prevent any rotation, a rack rigidly secured to said bar, said rack being formed with a pair of hub extensions, a draft member loosely journaled on said hub extensions, a catch carried by said draft member adapted to co-act with said rack for locking the draft member in any adjusted position, and a construction acting as a universal connection carried by the free end of said draft member for connecting an implement to the free end of said draft member.

6. A hitch for tractors comprising a transversely positioned bar square in cross section, means engaging said bar for connecting the same with a tractor, said means preventing a rotation of the bar, a rack having a square opening therein, said rack fitting on said bar, a pair of draft plates connected with said bar in such a manner as to freely rotate around the bar, said plates straddling said rack, a spring pressed catch carried by said plates and co-acting with said rack for locking the plates in any adjusted position, a lever co-acting with said catch and said plates for shifting the draft plates from one position to another, and means carried by the outer end of the draft plates for connecting an implement to the draft plates.

7. In a hitch for tractors, a pivotally mounted draft member, means for connecting one end of said draft member with a tractor, means for swinging said draft member vertically, and means for connecting an implement to the free end of said draft member, said last mentioned means being rotatably mounted on said draft member in such a manner as to permit said implement to be rocked.

8. A hitch for tractors comprising a stationary bar, means for connecting said stationary bar with a tractor so that the bar cannot rotate, a draft member pivotally mounted on said bar, means for locking said draft member in a number of adjusted positions, a draft link pivotally connected with said tractor and formed with a plurality of notches at its free end, a pin extending from said draft member adapted to engage said link in one of said notches to distribute the strain from the draft member between the link and said shaft, and means carried by the free end of said draft member for connecting an implement thereto.

9. A hitch of the character described comprising a shaft square in cross section, a pair of fittings positioned on said shaft, means for connecting said fittings to a tractor, a rack having a square opening therein fitted on said square shaft, said shaft filling said opening whereby the rack cannot rotate, said rack member having laterally extending hub sections, a pair of draft plates loosely mounted on said hub sections, a catch carried by the draft plates co-acting with said rack for locking the draft plates in different positions, a pin journaled on the outer or free end of said plates and extending from one plate to the other, a disk adjustably bolted to said pin, and means pivotally mounted on said disk for connecting an implement thereto.

10. A hitch for tractors comprising a shaft, means for connecting the shaft with the tractor, a pair of plates pivotally mounted on said shaft, means for moving and then locking in a plurality of positions said plates, a rotatable pin mounted on said plates at the free end, a disk arranged adjacent said pin, means for adjustably clamping said disk to said pin, and a pivotally mounted structure for connecting an implement to said disk, said structure swinging horizontally.

11. In a hitch for tractors, a swinging draft member, a rotatable pin carried by said draft member, a disk adjustably bolted to said pin, said disk being adjustable in a vertical plane positioned at right angles to the swinging movement of said draft member, means for connecting an implement to said disk, said means being pivotal in a substantially horizontal plane, and a pair of springs connected with said disk and with said means for limiting the horizontal swinging movement thereof.

12. In a hitch for tractors, a pivotally mounted draft member, means for swinging the draft member in a vertical plane, and means defining a substantially universal connection for connecting an implement to the free end of the draft member.

13. In a hitch of the character described, a swinging draft member, means for swinging said draft member in a vertical plane so that the free end may be raised and lowered, means for locking the draft member in any adjusted position, a rotatable pin carried by the free end of said draft member, a disk rigidly secured to the pin, an implement connecting member pivotally mounted on said disk so as to swing in a plane at right angles to the swinging movement of said pin, and means for resisting and limiting the swinging movement of said implement connecting means.

14. A hitch for tractors comprising a transversely positioned shaft, an arm for supporting the end of a plow beam, means for attaching said arm to said shaft so that the arm will rotate in a vertical plane, and a lever for adjusting said arm for causing an adjustment of said plow to different depths in the soil.

15. In a hitch for tractors, the combination with a plow having a beam, of a transverse shaft, a beam carrying arm connected with said shaft and with the beam of said plow, a swinging lever for moving vertically the end of said arm to which said beam is connected so that the beam will be moved and the plow caused to operate at different depth and means for flexibly connecting said beam with said arm so as to keep the plow in a vertical position regardless of the angle of said arm.

16. A hitch for tractors comprising a shaft, an arm connected with said shaft, means for connecting the beam of a plow to said arm, a handle for swinging said arm around said shaft to cause the plow to operate at different depths and to also cause the plow to be tilted so that it will drag on its heel.

17. A hitch for tractors comprising a transverse shaft, an arm connected at one end with said shaft, means for connecting the opposite end to a plow beam, and means for shifting said opposite end vertically for changing the position of said plow beam so as to cause the plow beam to operate at different depths in the soil.

18. A hitch for tractors comprising an arm, means for connecting said arm with a tractor so that the arm may swing substantially in a vertical plane, means for connecting one end of said arm with a plow; and means for moving said arm so as to cause said plow to operate at different depths.

19. A hitch for plows comprising a shaft, means for connecting the shaft with a tractor, an arm rotatably mounted on said shaft, means for swinging said arm in a vertical plane substantially parallel with the wheels of the tractor, and means for connecting the beam of a plow to one end of said arm, said means including elements adjustable around the axis exteriorly substantially axially of the beam of said plow.

20. The combination with a tractor, a rotary arm, means for connecting said rotary arm with a tractor, a lever for swinging said arm in a vertical plane and means for connecting a plow beam to said arm, said means being rotatably adjustable in substantially a vertical plane at right angles to the plane of movement of said arm.

21. In a hitch for tractors, a draft member, means for swinging said draft member in a vertical plane so as to raise and lower the free end thereof, means for locking the draft member in any adjusted position, a pivotally mounted pin carried by the free end of said draft member, a disk arranged adjacent said pin provided with a pair of arc-shaped slots, a bolt extending through each of said slots for bolting the disk to said pin in differently adjusted positions, and means pivotally mounted on said disk for connecting an implement thereto, said means swinging in a plane substantially at right angles to the plane of movement of said pin.

22. A hitch for tractors comprising a yoke, a pull bar carried by the yoke, an arm carried by the pull bar and adapted to be connected to a plow, and means for causing said arm to move in a vertical plane around a point concentric with said bar.

23. In a hitch for tractors, a swinging draft member, a rotatable pin carried by said draft member, a disk adjustably bolted to said pin, said disk being rotatably adjustable in a plane normal to said pin and means for connecting an implement to said disk, said means being mounted to swing substantially horizontally.

24. A hitch for tractors comprising a vertically swinging bar and means for connecting said bar with the beam of a plow, said means including a pivotal pin positioned so as to permit the plow to be swung horizontally, said vertically swinging bar acting to raise and lower the front end of the beam of said plow.

25. A hitch for tractors comprising a yoke, a vertically swinging arm, means connecting one end of said arm with said yoke and a horizontally swinging member connecting the opposite end of said arm with the front end of the plow beam whereby the front end of the plow beam may be swung up and down as said arm is swung.

26. A plow hitch for tractors comprising a swivel member mounted for rotary movement on said tractor, a transverse bar mounted on said swivel member, a pivotally mounted member arranged on said bar, means for rotating said pivotally mounted member in a vertical plane, means for locking said pivotally mounted member in different positions, and means for connecting to the free end of said pivotally mounted member a plow or other implement.

GEORGE H. SCANLAN.